(12) United States Patent
Carboni et al.

(10) Patent No.: US 12,103,722 B2
(45) Date of Patent: Oct. 1, 2024

(54) PACKAGING PROCESS, PACKAGING APPARATUS AND RELATED CONTROL SYSTEM

(71) Applicant: G.D S.P.A., Bologna (IT)

(72) Inventors: Salvatore Carboni, Bologna (IT); Antonio Vitali, Bologna (IT)

(73) Assignee: G.D S.P.A., Bologna (IT)

( * ) Notice: Subject to any disclaimer, the term of this patent is extended or adjusted under 35 U.S.C. 154(b) by 146 days.

(21) Appl. No.: 17/998,588

(22) PCT Filed: Jul. 5, 2021

(86) PCT No.: PCT/IB2021/056004
§ 371 (c)(1),
(2) Date: Nov. 11, 2022

(87) PCT Pub. No.: WO2022/009068
PCT Pub. Date: Jan. 13, 2022

(65) Prior Publication Data
US 2023/0182935 A1   Jun. 15, 2023

(30) Foreign Application Priority Data
Jul. 9, 2020   (IT) .................. 102020000016690

(51) Int. Cl.
| | |
|---|---|
| *B65B 5/06* | (2006.01) |
| *B65B 35/24* | (2006.01) |
| *B65B 57/06* | (2006.01) |
| *B65B 57/14* | (2006.01) |

(52) U.S. Cl.
CPC ............... *B65B 5/06* (2013.01); *B65B 35/24* (2013.01); *B65B 57/06* (2013.01); *B65B 57/14* (2013.01)

(58) Field of Classification Search
CPC .................................. B65B 5/06; B65B 57/14
See application file for complete search history.

(56) References Cited

U.S. PATENT DOCUMENTS

2013/0319818 A1   12/2013   Wörz

FOREIGN PATENT DOCUMENTS

| EP | 2233400 A1 | 9/2010 |
| WO | 2022/009068 A1 | 1/2022 |

OTHER PUBLICATIONS

International Search Report and Written Opinion for PCT/IB2021/056004 filed on Jul. 5, 2021 in the name of G.D S.P.A., mailed on Oct. 5, 2021. 10 pages.

*Primary Examiner* — Daniel Jeremy Leeds
(74) *Attorney, Agent, or Firm* — Steinfl + Bruno LLP

(57) ABSTRACT

A packaging process, apparatus and control system for articles to be packaged in box-shaped packagings are presented. The flow of box-shaped packagings and the flow of articles are efficiently managed, avoiding an excessive discarding of the box-shaped packagings during the process. Articles and open box-shaped packagings are conveyed in a continuous flow. Packaging compliance with the instructions related to the box-shaped packagings and article compliance with instructions related to the deposit of the articles are verified. Upon verification of the packaging compliance, the articles are transferred to the box-shaped packagings. In case of lack of packaging compliance, the flow of articles is suspended. In case of lack of article compliance, the articles to be transferred are moved to a buffer.

18 Claims, 9 Drawing Sheets

PACKAGING PROCESS, PACKAGING APPARATUS AND RELATED CONTROL SYSTEM

CROSS REFERENCE TO RELATED APPLICATIONS

The present application is the US National Stage of International Patent Application No. PCT/IB2021/056004, filed internationally on Jul. 5, 2021, which, in turn, claims priority to Italian Application No. IT 102020000016690, filed on Jul. 9, 2020.

The present invention is referred to a process for packaging articles which are intended to be packaged in a corresponding packaging apparatus, and to a control system that leads the execution of this process in a packaging apparatus.

The present invention finds a preferred, though not exclusive, application in the field of in-box packaging of loose articles, such as capsules for products by infusion, for example coffee, a field to which reference may be made hereafter without loss of generality.

In particular, in the relevant technical sector, packaging apparatuses are known where the articles, which are intended to be packaged, are supplied through special inlet lines and where they are subsequently arranged in predefined configurations that let them be packed inside box-shaped packagings in the most compact manner possible.

In this description as well as in the accompanying claims, certain terms and expressions are deemed to have, unless otherwise expressly indicated, the meaning expressed in the following definitions.

Here and hereafter, "article to be packaged" means an article intended to be packaged, in a certain number, in a container, such as a box or, in general, a packaging.

In particular, it is envisaged that, for this purpose, the articles to be packaged are arranged on a conveying line, which comprises at least two rows of articles to be packaged, according to a particular configuration. This configuration, referred to below as pattern, is the repetitive arrangement in which the articles to be packaged are positioned in said rows, and which is transferred to said packaging. An example of a predetermined pattern, by way of illustration, could be a checkerboard pattern.

The articles can be, for example, food and confectionery products already packaged in individual containers or wrappers, such as coffee capsules or other infusion drinks, bottles and cartons of beverages, yoghurt pots, individual chocolates (wrapped or bare), candies, small boxes, pouches containing solid, liquid or semi-solid food products; moreover, products of the ceramic industry, absorbent products for hygienic use, products of the tobacco industry, products of the cosmetic industry, products of the pharmaceutical industry, products of the personal & home care industry.

The articles may be identical to each other, or they can differ from each other for some characteristic of shape and/or appearance, such as the conformation, the composition, the colour or the orientation with respect to other articles which are intended to be packaged.

Again purely by way of example, an article to be packaged is represented by a capsule, i.e. a hollow element of round or cylindrical shape, having the function of a container, of wrapping, of casing, of protection, of covering or closing of a product contained within it, therefore possessing a predetermined shape, in which a head and a bottom are identified, which envisages that it is provided in an upright vertical arrangement, resting on its bottom on a transport plane defined by the respective conveying line, but which may possibly assume an upturned arrangement, always with respect to a vertical axis, resting on the head opposed to said bottom, where, on the conveying line, seats, such as recesses and/or supports, may be provided to maintain the element in the aforesaid arrangements, in particular where they do not have a bottom and/or a head suitable for acting as a stable support base on said transport plane.

One of these positions may be identified as a head-to-head upright arrangement, referred to as an upright arrangement for short, while the opposite position may be identified as a head-to-bottom upturned arrangement, referred to as an upturned arrangement for short.

It is understood that the use of two or more different arrangements may apply to any article to be packaged, in particular when the selected arrangements are intended to achieve an interlocking and/or a more compacted framing within a target packaging.

Inside the pattern, as defined above, the elements to be packaged constitute a compact assembly wherein the respective arrangements and/or types vary within that assembly, but they are equally repeated from assembly to assembly.

In case of capsules, they may be arranged in upright and upturned arrangements in the same predetermined pattern, or with capsules staggered and alternating with each other according to their respective upright or upturned arrangement.

It is understood that the articles to be packaged are continuously fed when they move at a predetermined speed, possibly variable, i.e. subject to acceleration and deceleration, but never nihil. Continuous feeding therefore differs from step feeding, in which the packaging articles move in a step-by-step motion.

The supply of articles which are intended to be packaged determines a flow of articles which are intended to be packaged, which can be continuous if the supply is continuous.

A "transfer device" is a device designed to carry out a transfer of articles which are intended to be packaged from a transport line to a box-shaped intended packaging. A transfer device comprises, for example, a handling member, such as an assembly of articulated arms, and a gripping device, preferably movable in space, i.e. at least capable of moving the gripping device along three orthogonal axes, (X, Y, Z), controlled by said handling member, with laws of motion and relevant trajectories that the gripping device and the articulated arms travel in space.

The "flow of box-shaped packagings" means a supply of box-shaped packagings or the like onto a respective transport line, where they are filled with articles which are intended to be packaged; in this respect the packagings are supplied in an open configuration, i.e. allowing the laying of articles which are intended to be packaged, without requiring any opening operation to the packaging itself.

It is also understood that the box-shaped packagings can also be supplied continuously, making the relevant flow as described for the articles which are intended to be packaged.

"Layered arrangement" refers to the positioning of articles which are intended to be packaged, in the final packaging, on superimposed layers. In a layered arrangement, the use of a predetermined pattern of the articles which are intended to be packaged in each layer can result in a greater compactness of the articles which are intended to be packaged, and thus in the packaging of articles in smaller volumes.

"Correct placing" of a layer of articles intended to be packaged means a layer that comprises the intended number of articles intended to be packaged and occupies an intended position in the intended packaging.

On the contrary, "incorrect placing" of a layer means the placing of a layer that does not comprise the intended number of articles which are intended to be packaged and/or does not occupy an intended position in the intended packaging.

"Buffer" refers to a station where a quantity of articles which are intended to be packaged is placed to await a further transfer.

The Applicant noted that, in packaging processes, the speed of transfer and insertion of the articles which are intended to be packaged into the intended packagings is crucial to the overall economics of the process, as high production volumes can be achieved with fewer packaging apparatuses.

Furthermore, the Applicant observed that, in addition to the need to proceed as quickly as possible, another important and unavoidable requirement is the flexibility required of this type of plants, in particular with regard to the different packaging formats, which may contain, for example, a few articles on one or two layers, up to many articles, for example twenty-four (6×4) on a large number of layers, for example five.

This requirement is felt when, in case of capsules, they have a substantially truncated conical or truncated pyramidal shape, or equivalent shapes, or other shapes that allow the upright and upturned capsules to be set together in a predetermined arrangement.

By way of example, single small-format packagings and single large-format packagings can be envisaged; a single small-format packaging might contain, for example, two layers each consisting of a single row of three or four capsule elements, or two layers each with 2×3 capsule elements.

On the other hand, a large-format box might contain three 4×5 layers, or four or five 4×6 or 5×6 layers, and it is essential not only that the same plant can ensure these different packagings, but that it can do so with the replacement of a minimum number of parts.

The Applicant has also verified that a rapid filling of packagings supplied in a continuous flow appears to be a somewhat promising solution, but this filling can be carried out by a plurality of transfer devices which are arranged along a line of predetermined length, acting as transfer devices for the box-shaped packagings.

The Applicant also verified that the transfer from line to conveying line can be performed by pick-and-place robotic systems.

The Applicant further observed that, in a packaging process involving continuous flows of both articles which are intended to be packaged and box-shaped packagings, the synchronisation between the two flows is essential to limit and virtually eliminate the rejection of both packagings with a filling that does not comply with predetermined rules of conformity and articles which are intended to be packaged that have been set aside in the buffer, awaiting a possible reuse.

As mentioned above, the Applicant, moreover, understood that this problem outlined herein is particularly felt when, in a process and/or in a packaging apparatus, the box-shaped packagings are continuously formed and then supplied together with the continuous supply of the articles which are intended to be packaged.

In fact, any defect in the formation of a box-shaped packaging would lead to the lack of the same in the respective supply flow, that is a gap that would have to be filled with articles which are intended to be packaged which, however, would not find their destination.

The Applicant also considered that similar problems may occur in other operating situations. For example, at an initialisation step of the packaging process, the supply of articles which are intended to be packaged may exceed the availability of box-shaped packagings, and a portion of them would have to be set aside.

A similar situation can occur in case of a change of format of box-shaped packagings: possibly switching from a large packaging to a small packaging, it would happen that a part of the articles supplied on the respective flow be available in excess with respect to the availability in the new box-shaped packagings.

Even a change of format from a small packaging to a large packaging and, in general between two different formats, could cause a prolonged gap in the supply of box-shaped packagings in a flow, and this should result in the surplus of already packaged articles being set aside.

The Applicant also observed that the setting aside of articles which are intended to be packaged might still be necessary, in particular in a deposition of successive layers, if it turned out, as the filling of a box-shaped packaging progresses along its respective flow, not to comply with predetermined rules of conformity.

In this case, the articles that are intended to be packaged, and that are needed to complete that particular arrangement, would already be about to be removed, but they could be set aside in appropriate buffers, if available.

Therefore, the Applicant considered that these buffers could not be overloaded with articles which are intended to be packaged, then set aside because of an incorrect box-shaped packaging feed.

The Applicant therefore perceived that the drawbacks mentioned with reference to the prior art can be obviated by carrying out a first step of conveying the articles which are intended to be packaged, which could be suspended if a non-conformity is detected in a second step of conveying the box-shaped intended packagings, while the setting aside of the articles which are intended to be packaged could be used when an incorrect filling of the box-shaped packs is detected, as such filling is processed.

The Applicant finally found a packaging process in which there is a step of conveying the box-shaped packagings, in which a conformity with respective predetermined instructions in relation to the formation and the start of the box-shaped packagings in a respective continuous flow is verified, and if this conformity is not respected, this involves the suspension of the step of conveying the articles which are intended to be packaged for incorrect box-shaped packagings, whereas the detection of an error in the deposition of the packaged articles can be obviated by moving the articles still to be deposited in that specific packaging in a buffer.

In particular, in a first aspect thereof, the invention relates to a packaging process.

Preferably, this process relates to packaging of articles which are intended to be packaged in box-shaped packagings.

Preferably, the packaging process comprises a first step of conveying articles which are intended to be packaged.

Preferably, in said first conveying step, the articles which are intended to be packaged are supplied on a first transport line.

Preferably, the first transport line defines a first continuous flow of articles which are intended to be packaged.

Preferably, the packaging process comprises a second step of conveying box-shaped packagings.

Preferably, the aforesaid box-shaped packagings are sent onto a second transport line.

Preferably, said second transport line defines a second continuous flow of box-shaped packagings.

Preferably, said box-shaped packagings, when they are sent in said continuous flow, are in an open configuration.

Preferably, in the aforesaid second conveying step, a first conformity with respective pre-determined instructions in relation to said box-shaped packaging is verified.

Preferably, the packaging process comprises a step of transferring a plurality of articles which are intended to be packaged from the first transport line to the box-shaped packagings of said second transport line.

Preferably, said transfer step takes place with several successive transfers, in which a deposition of articles which are intended to be packaged is made.

Preferably, for each transfer, a second conformity with respective pre-determined instructions in relation to the deposit of the articles which are intended to be packaged in a box-shaped intended packaging is verified.

Preferably, in the aforesaid packaging process, if said first conformity is not respected, said first conveying step is suspended.

Preferably, if said second conformity is not respected, the articles to be packaged and which are still to be transferred are moved to a buffer.

In this way, in the packaging process according to this embodiment, it is possible to block the access of the articles which are intended to be packaged when the box-shaped intended packagings are not temporarily available, either due to a problem in their supply and/or in their forming, or in case of a simple lack thereof.

In this way, the buffers which are present in the packaging apparatus are not overloaded, nor does it happen that packaging articles cross the apparatus without being packaged regularly.

On the other hand, the incomplete incorrect containers can be excluded as soon as an incomplete layer, or an incorrect deposition of articles is detected, without waiting for the end of the container filling process.

The articles that would have been inserted in the container, can be retrieved immediately, and reinserted into the packaging process.

In a second aspect thereof, the invention relates to a packaging apparatus for articles which are intended to be packaged.

Preferably, said articles which are intended to be packaged are supplied in a first continuous flow, on a respective first transport line.

Preferably, the packaging apparatus comprises a first conveying station for said articles which are intended to be packaged in said first continuous flow.

Preferably, the packaging apparatus comprises a second transport line.

Preferably, a second continuous flow of box-shaped packagings is transported on said second transport line.

Preferably, said box-shaped packagings are in an open configuration, and are capable of being filled with said articles which are intended to be packaged.

Preferably, said box-shaped packagings are filled with said articles which are intended to be packaged.

Preferably, the packaging apparatus comprises a second conveying station for said box-shaped packagings.

Preferably, said second conveying station generates a first error signal for each box-shaped packaging which does not comply with respective first predetermined instructions.

Preferably, the packaging apparatus comprises one or more transfer devices.

Preferably, said transfer devices each removes a layer of articles which are intended to be packaged and deposit it in a box-shaped packaging of said second continuous flow.

Preferably, the packaging apparatus comprises one or more image recording devices.

Preferably, each image recording device corresponds to a respective transfer device, or to more transfer devices.

Preferably, said one or more image recording devices are provided to detect the conformity of the articles which are intended to be packaged that are deposited downstream of the corresponding one or more transfer devices, with respect to the flow of box-shaped packagings, and to output a second error signal in the event of a lack of conformity.

Preferably, the packaging apparatus comprises a control unit which receives said first and second signals.

Preferably, said control unit is provided to suspend said first continuous flow in said first conveying station when it receives said first error signal.

Preferably, said control unit is provided to control the transfer devices downstream of the image recording device which has generated a second error signal so that they transfer to a buffer the articles which are intended to be packaged and to be deposited subsequently in the box-shaped packaging of said second continuous flow on a buffer.

Thanks to these features, the packaging apparatus can efficiently manage both the flow of box-shaped packagings and the flow of articles which are intended to be packaged, preventing the latter from being excessively discarded during the packaging process.

Any gaps, of whatever nature, in the box-shaped packagings are compensated for by interrupting the flow of articles which are intended to be packaged in the apparatus, while any errors in the deposition of articles which are intended to be packaged in the packagings can be compensated for without overloading the buffers, from which the articles which are intended to be packaged can then be sent back to the packaging process.

In a third aspect thereof, the present invention relates to a control system for carrying out, in a packaging apparatus, a packaging process.

Preferably, the packaging process, which is carried out by the control system according to the invention, comprises a first step of conveying articles which are intended to be packaged.

Preferably, the articles which are intended to be packaged are sent on a first transport line which defines a first continuous flow of articles which are intended to be packaged.

Preferably, the packaging process, which is carried out by the control system according to the invention, comprises a second step of conveying box-shaped packagings.

Preferably, the box-shaped packagings are sent on a second transport line which defines a second continuous flow of box-shaped packagings.

Preferably, said box-shaped packagings are sent in an open configuration.

Preferably, the packaging process, which is carried out by the control system according to the invention, comprises a step of transferring a plurality of articles which are intended to be packaged from the first transport line to the box-shaped packagings of said second transport line.

Preferably, said transfer step takes place with several successive transfers, in which a deposition of articles which are intended to be packaged is made.

Preferably, in the control system according to the invention it is provided that a first error signal is output for each box-shaped packaging which does not comply with respective first predetermined instructions.

Preferably, in the control system according to the invention it is provided that a second error signal is output if a transfer fails.

Preferably, said first error signal determines the suspension of said first conveying step.

Preferably, said second error signal determines a redirection of the articles which are intended to be packaged and which are still intended to be transferred to a buffer, so that they can subsequently be transferred from the buffer to other box-shaped packagings.

With the control system in accordance with the aforesaid characteristics, an efficient feedback in the packaging apparatus is therefore realised, whatever the reason for the deposition in the box-shaped packagings being interrupted or delayed.

In at least one of the aforesaid aspects, the present invention may further comprise at least one of the following preferred features.

Preferably, the articles which are intended to be packaged that have been moved onto said buffer are subsequently transferred from the buffer to other box-shaped packagings.

Preferably, said first transport line and said second transport line are arranged in close proximity to each other.

Preferably, they are arranged parallel with each other.

Preferably, there is provided a succession of transfer devices between them, which carry out the transfer of the articles which are intended to be packaged from the first transport line to the box-shaped packagings on the second transport line.

Preferably, the flow of articles which are intended to be packaged on the first transport line and the flow of box-shaped packagings on the second transport line move in counter-current with respect to each other.

According to a preferred embodiment of the present invention, each article to be packaged is supplied into a first conveying station on a plurality of rows in an inlet conveying line which supplies said first transport line.

Preferably, said articles which are intended to be packaged, in said inlet conveying line, are continuously supplied, and it is provided that the articles which are intended to be packaged are spaced uniformly on the first conveying line in which they are continuously transported.

Preferably, in an embodiment of the present invention, each transfer device corresponds to a respective image recording device which is arranged downstream with respect to the flow of the box-shaped packagings.

Preferably, the image recording devices comprise a camera with a focal spacing corresponding to the spacing between its lens and the layer to be detected.

Preferably, an embodiment of the packaging apparatus according to the present invention comprises a plurality of buffers, arranged in the region of said first transport line.

Preferably, they are provided to receive articles which are intended to be packaged and laid by said transfer devices.

Preferably, in such an embodiment, the transfer devices lay articles which are intended to be packaged in said buffers following a non-conformity with respective deposition instructions, which determines a second error signal.

In addition, in a preferred version of this embodiment, the buffers comprise support planes which are positioned close to the transfer devices, on which the articles are positioned in a predetermined arrangement.

Preferably, in the packaging process according to the present invention there is provided a step of removing the articles which are intended to be packaged from said first transport line, which step provides for the formation, in a respective transfer device, of a single layer of articles which are intended to be packaged and which have predetermined dimensions before the respective transfer step.

Preferably, said removal step provides for more removals of articles which are intended to be packaged before transferring the single whole layer in a box-shaped intended packaging.

Preferably said first error signal is output when a box-shaped packaging is not suitable for being filled.

Preferably said first error signal is output when a box-shaped packaging is not present in the respective continuous flow.

Preferably said first error signal is output in said second conveying step.

Preferably said first error signal is output when one or more box-shaped packagings are filled with articles which are intended to be packaged removed from the buffer, thus further increasing the efficiency of the system in managing the capsules without discarding them.

Preferably, the packaging apparatus comprises a plurality of transfer devices.

Preferably, the suspension of the flow of articles which are intended to be packaged takes place at an inlet line, which is realised by conveyor belts on which the articles which are intended to be packaged travel in a respective single and continuous row.

Preferably, each conveyor belt is associated with a respective accelerator belt, which acts on the articles which are intended to be packaged by sending them in a continuous advancing flow.

Preferably, each accelerator belt is driven by an electric motor which is controlled by the control unit, so that the two accelerator belts 122 can be stopped independently of each other, and if they are stopped at the same time the start of the articles which are intended to be packaged is suspended. The control unit suspends said first conveying step when a first error signal is output and, when said first error signal ceases, the accelerator belts are restarted.

The characteristics and advantages of the invention will become clearer from the detailed description of an embodiment illustrated, by way of non-limiting example, with reference to the appended drawings wherein.

Figure 1:
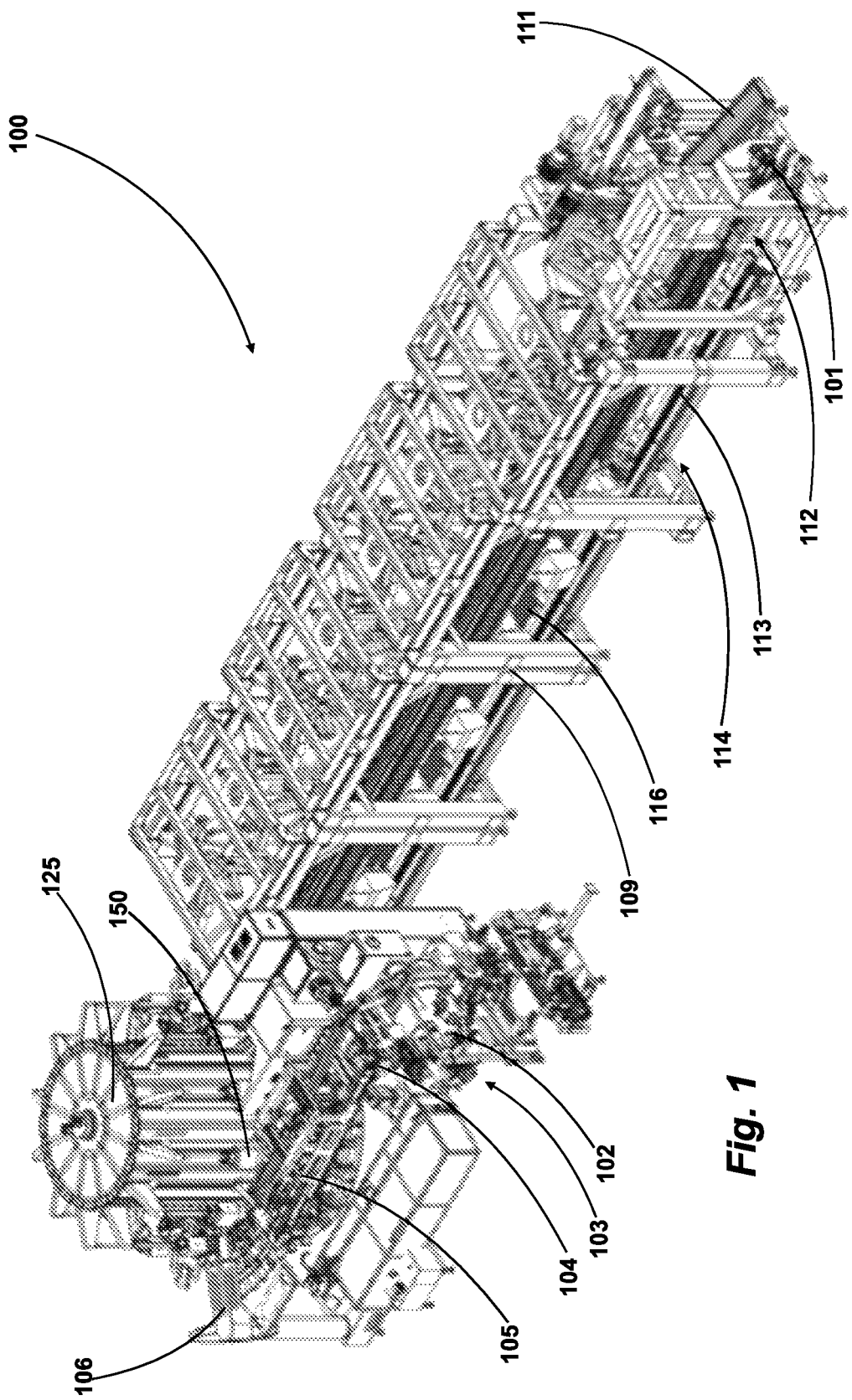
FIG. 1 shows a first perspective view of an example of an embodiment of a packaging apparatus for articles according to the present invention.
Figure 2:
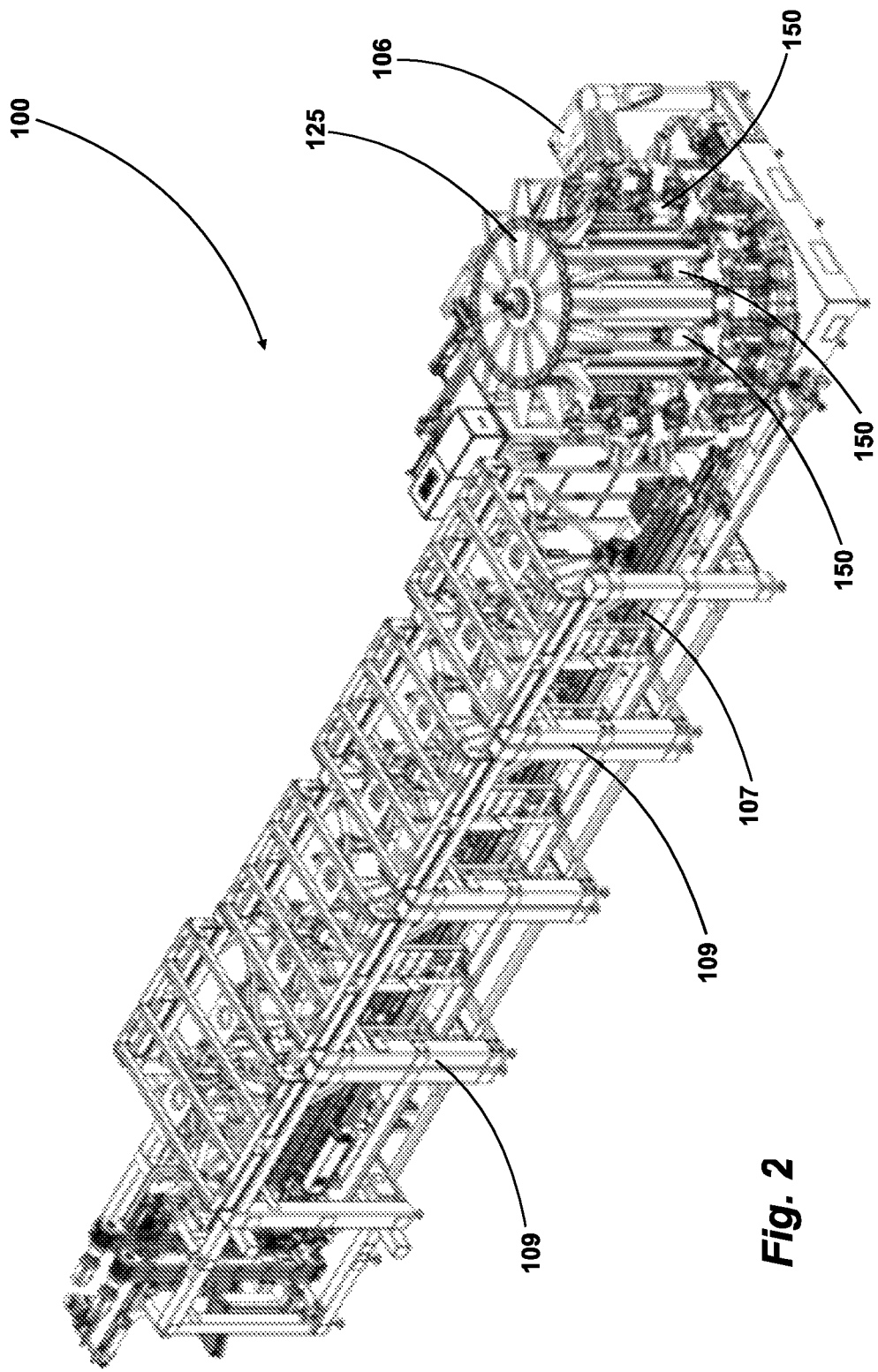
FIG. 2 shows a second perspective view of the packaging apparatus of FIG. 1, from a different point of view to that of the previous figure to show the opposite side.
Figure 3:
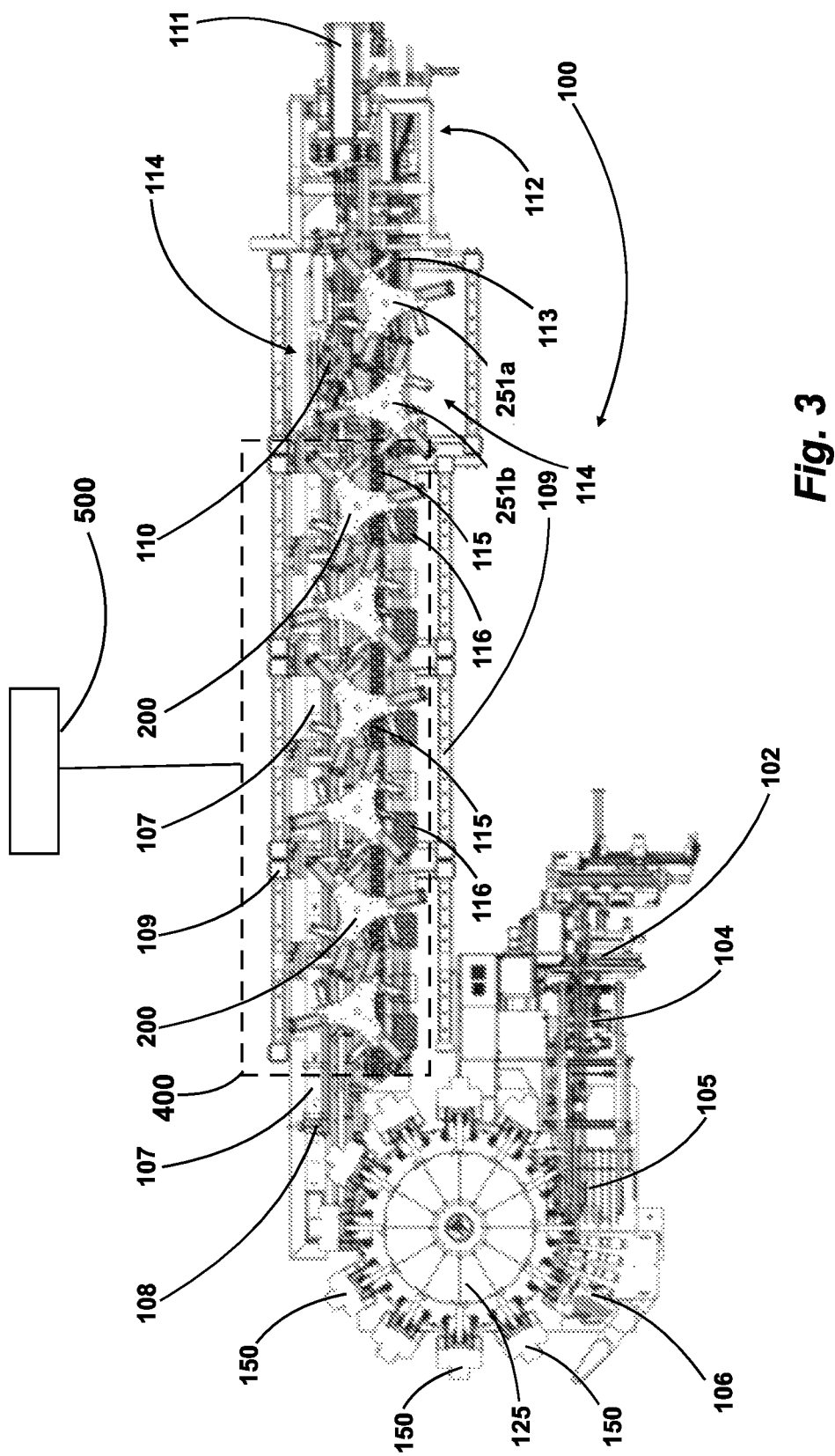
FIG. 3 shows a plan view from above of the packaging apparatus in FIG. 1.

In the accompanying figures, 100 indicates as a whole an apparatus for packaging articles which are intended to be packaged 1, comprising a packaging device 400 which in turn comprises a feeder device 300 operating at the head thereof and carrying out a first step of conveying articles which are intended to be packaged in a packaging process.

The packaging apparatus 100 is operated in such a manner as to carry out the process according to the present invention, which, moreover, is provided by a control system which manages said apparatus.

The embodiment described below refers to articles to be packaged in a packaging, in particular a box-shaped packaging 30 in which articles that are different from each other, or the same but in different configurations, are arranged in a sorted manner on superimposed layers.

Figure 10:
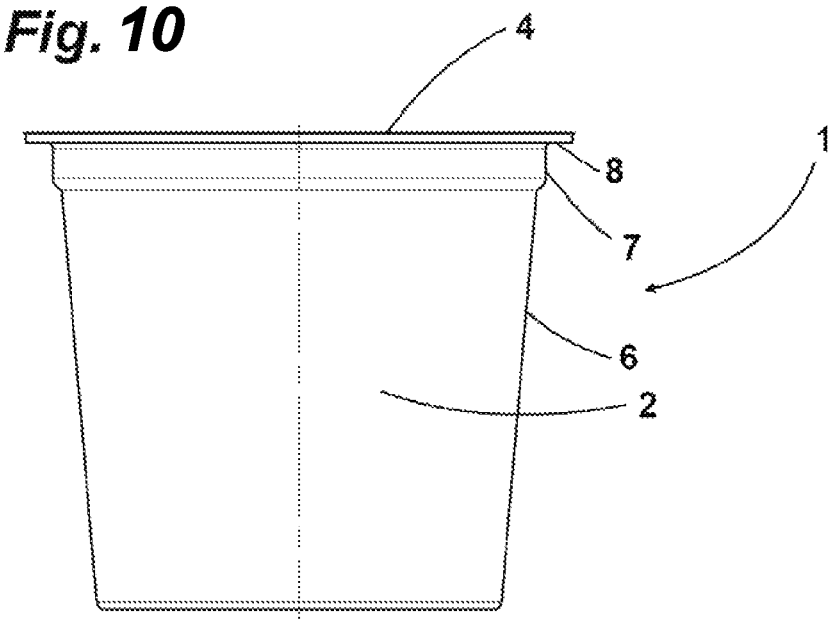
FIG. 10 shows an elevation view of an article which is intended to be packaged.
Figure 11:
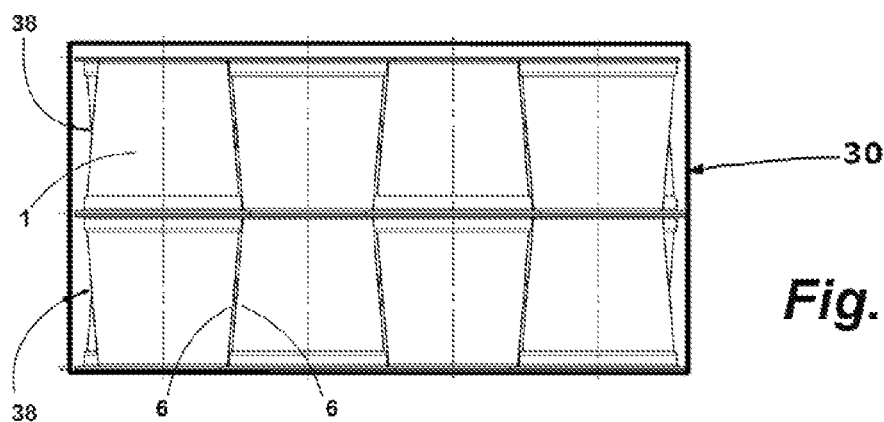
FIG. 11 shows a side view illustrating the arrangement of the articles which are intended to be packaged in a box-shaped packaging.
Figure 12:
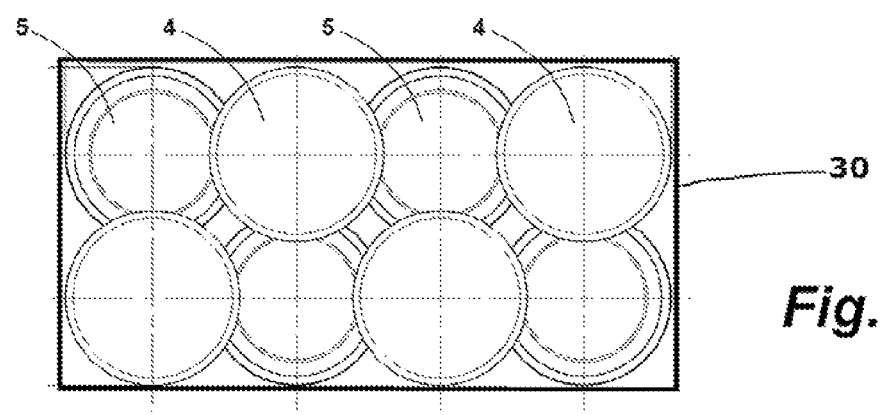
FIG. 12 shows a view from above illustrating the arrangement of the articles which are intended to be packaged in the box-shaped packaging of FIG. 11.

In this example, with reference to FIGS. 10 to 12, a particular article to be packaged for non-limiting purposes, namely a capsule 1, is contemplated, such as a capsule for the production of drinks by infusion.

The capsule 1 is formed by a substantially rigid casing 2, which has a mouth 3 closed by a lid which, in the present example, is a laminar element that is adhered to the edges of this opening by gluing. The mouth 3 and the lid make a head 4 of the capsule 1, which is opposed to the bottom 5, which will be described below.

The lid 4 is applied to the casing 2 after the latter has been filled.

The casing 2, in the present example, may have a cup shape, i.e. a truncated cone shape having a bottom 5 at the smaller base thereof and inclined walls 6, with a slight flaring, and a top at which said mouth 3 is defined by a circular top edge 7 which has a protruding border 8 or shoulder on the top circumference.

Both the bottom 5 and the top lid 4 are substantially flat, so that the casing 2, i.e., the capsule, can assume a first upright bottom-to-head arrangement, in which the casing 2 rests on the bottom 5, and a second upturned head-to-bottom arrangement, in which the casing 2 rests on the lid 4, i.e., on the circular top edge 7 to which the lid 4 is applied.

Inside the box-shaped packaging 30, the articles which are to be packaged are arranged on superimposed layers 38, one of which is located at the bottom of the box-shaped packaging 30.

If the articles to be packaged are different from each other, in particular if they are of two different types, each layer 38 will be formed in such a manner that the different articles are arranged according to a predetermined pattern.

On the other hand, if the articles to be packaged are identical but arranged in different arrangements, in particular in two different arrangements, each layer 38 will be formed in such a manner that the articles in different arrangements are arranged in a predetermined pattern (FIGS. 11 and 12).

In the example described herein, where the articles to be packaged are capsules 1 of the form described above, they will be arranged in the box-shaped packaging 30 in two different arrangements: the aforesaid upright arrangement and the aforesaid upturned arrangement.

In a preferred version of this example, the two configurations will be arranged in each layer 38 in a checkerboard pattern, wherein each element 1 in an upright configuration is flanked laterally by capsules 1 in an upturned configuration, and vice versa.

In this way, each layer 38 may assume a compact configuration in which the inclined walls 6 of adjacent capsules 1 adhere (or are very close) to each other. It is understood, however, that the checkerboard pattern is only one of the possible patterns, which may also include honeycomb patterns, or other patterns suitable for particular shapes of the articles to be packaged.

In a preferred version of this example, the capsules 1 of superimposed layers 38 in contact with each other are arranged, within the respective pattern, with the bottoms 5 of capsules 1 of different layers in contact with each other, and with the lids 4 of capsules 1 of different layers in contact with each other. For example, this can be achieved by alternating layers 38 in a checkerboard pattern, in which the superimposed capsules 1 in upright configuration and in upturned configuration are alternated from layer to adjacent layer.

In a preferred version of this example, referring in particular to capsules 1 having a circular top edge 7 with a protruding border 8 or shoulder on the top circumference, the capsules 1 of each layer 38 are arranged staggered from each other at a spacing substantially equal to the height of the protruding border 8. In this way, in a compact configuration such as that obtained with the superposition of layers with a checkerboard pattern as described above, the bottom 5 of the capsules 1 will rest on the protruding border 8 of the adjacent capsules, so as to obtain a more compact configuration.

The above described compact configurations allow a certain number of capsules to be allocated in smaller box-shaped packagings 30, with clear advantages in terms of less space occupied.

The packaging apparatus 100 provides for both forming the box-shaped packagings 30 and filling them with articles to be packaged, particularly but not exclusively the capsules 1 described above, to obtain a finished packaging intended to be packaged for shipment.

For this reason, the packaging apparatus 100 of the present example embodiment is supplied with stacks of blanks and with capsules 1, which are supplied in an upright configuration at an inlet section 101.

More in details, the apparatus 100 has a first forming line which is supplied at a first inlet end thereof 102 with blanks by means of a supply station 103; this first forming line assumes a U-shaped configuration by travelling along a curve on a rotating forming carousel 125, which comprises a plurality of forming devices 150.

The supply station 103 performs the extraction of single blanks and is connected to a folding station 104 in which the blanks are arranged in a configuration in which they are sent on a blank conveyor 105. In the folding station 104 the blanks undergo a pre-folding of the panels and of the flaps that form the blank. In addition, they are correctly spaced apart from each other, also in view of their format, which may vary according to the box-shaped packaging 30 which is to be made.

The blanks conveyor 105 travels through a gluing station 106 in which a plurality of hot glue guns lay appropriate glue spots on appropriate flaps of the blanks. It supplies the forming devices 150 rotating on the forming carousel 125, so that each forming device 150 intersecting the final tract of the blanks conveyor 105 receives a respective blank in the correct position and already provided with the necessary glue spots.

In the curved section of the forming line, the forming devices 150 form respective box-shaped packagings 30 by means of folding operations of the panels forming the blank, adhering the flaps provided with glue to some of the panels thereof in an appropriate manner.

The devices along the first forming line are provided with sensors that are provided to output an initial error signal with the aim to inform a control unit 500 that a box-shaped packaging being formed has forming defects and is therefore not suitable for receiving articles which are intended to be packaged inside.

This first error signal is also output if, for whatever reason, a box-shaped packaging of the continuous flow through the forming line is not present.

This can occur, for example, if a blank is not supplied into the forming line, or if the stack of blanks is supplied causing the apparatus to lose continuity in the flow of the box-shaped packagings, or if a forming device is not functioning properly or is being replaced.

Otherwise, the first error signal is output if there is provided a change in the format of the box-shaped packagings, i.e. a variation in the number of articles which are intended to be packaged and/or layers to be deposited in the box-shaped packagings.

As it will be explained below in more detail, the packaging device 400 is provided to remove and pack articles which are intended to be packaged, which are supplied on a first transport line 115 operating continuously at a predetermined speed, as will be explained in greater detail below.

The packaging device 400, for the purpose of packaging them, inserts and lays the articles which are intended to be packaged and which are conveyed onto a second transport line 107, also operating continuously at a predetermined speed, which is arranged in proximity of said first transport line 115.

On the second transport line 107, the flow of box-shaped packagings is transported in an open configuration, which are capable of being filled with said articles which are intended to be packaged in layers of predetermined dimensions.

In this embodiment, the two transport lines 107, 115 are arranged one close to the other, developed along essentially parallel straight lines, and operating in counter-current.

As anticipated above, the packaging apparatus 100 has an inlet section 101 at which the capsules 1 are supplied in an upright configuration in a substantially unsorted manner.

Figure 4:
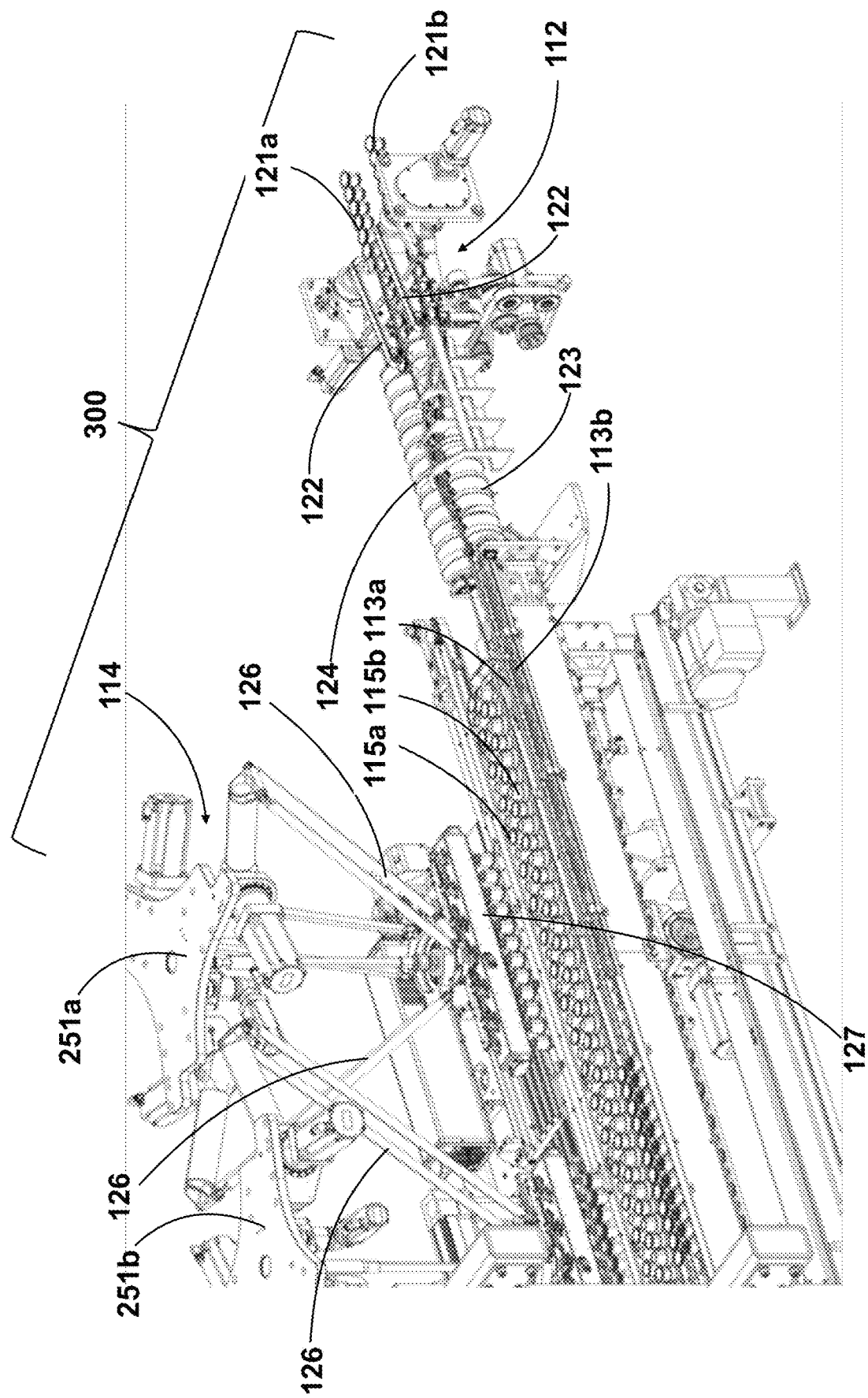
FIG. 4 shows an overall perspective view of a portion of the apparatus in the previous figures.
Figure 5:
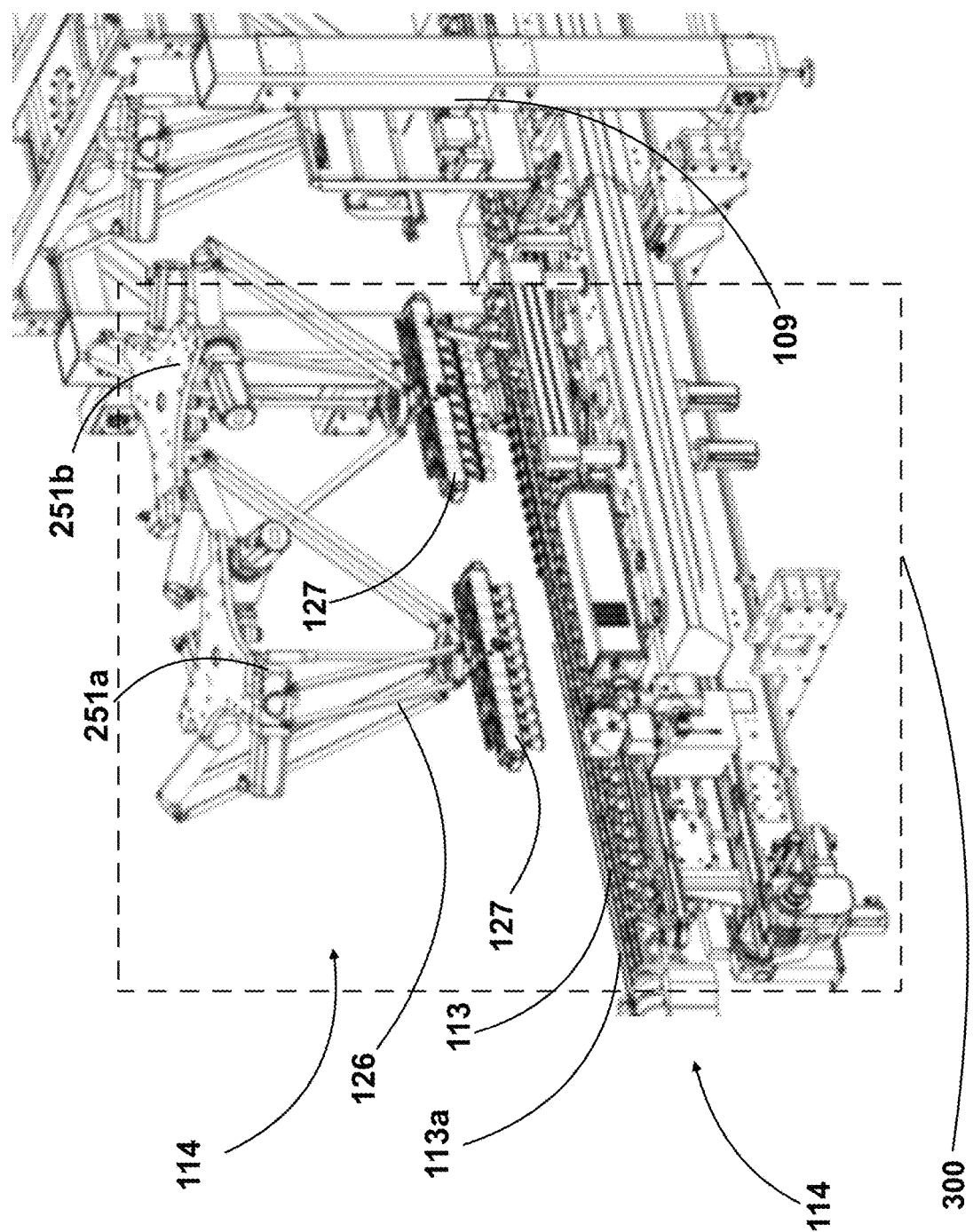
FIG. 5 shows a perspective view from above on an enlarged scale of another portion of the apparatus in FIGS. 1 to 3.
Figure 6:
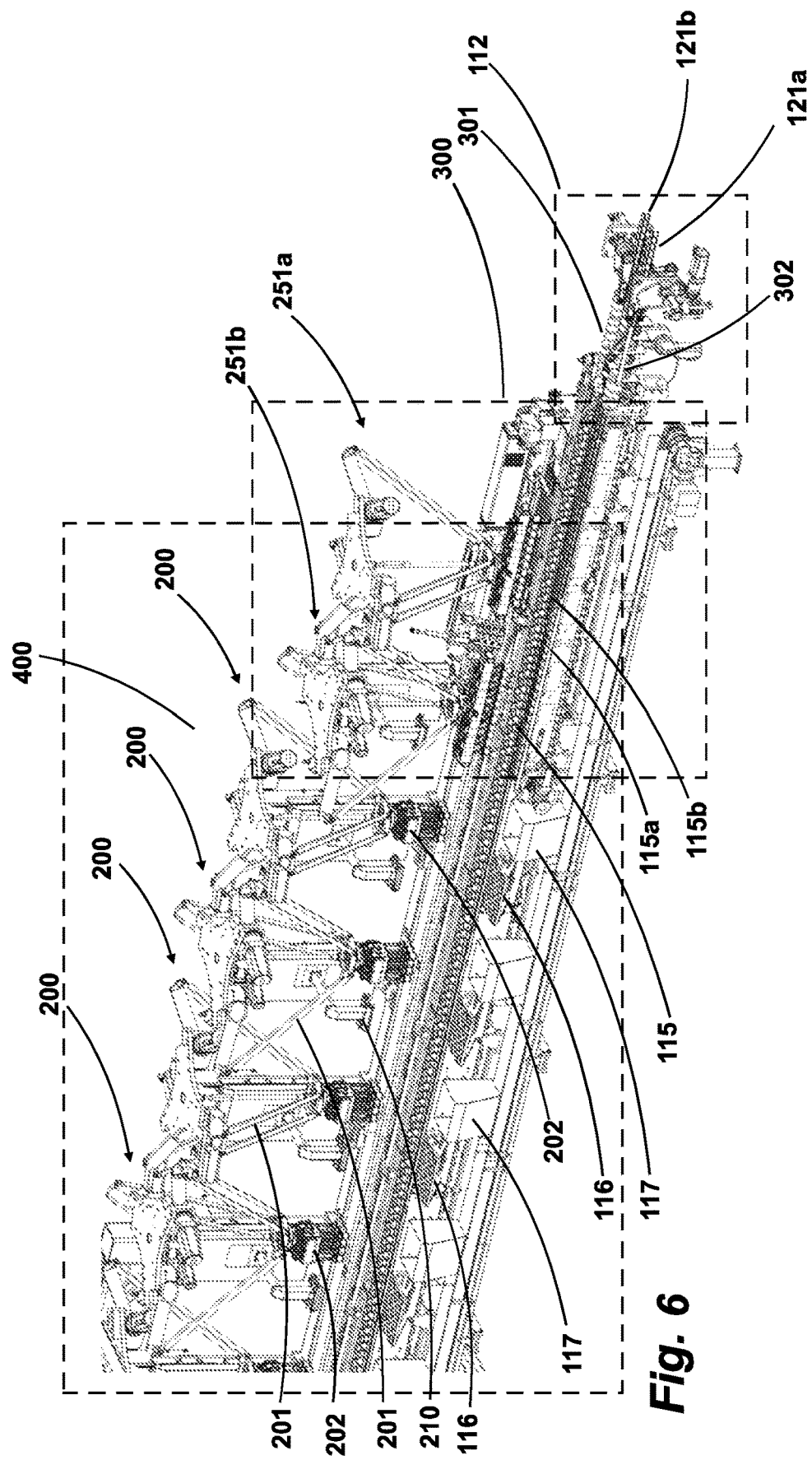
FIG. 6 shows an overall perspective view of the portions of the packaging apparatus in FIGS. 4 and 5.
Figure 7:
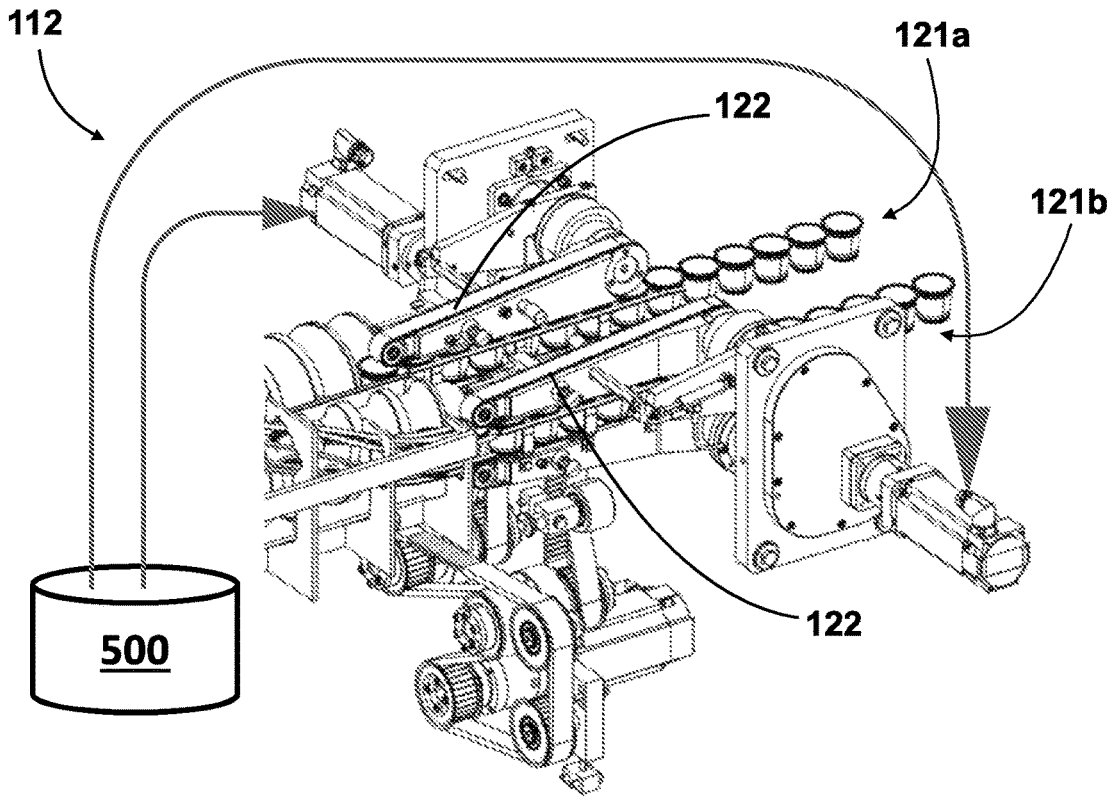
FIG. 7 shows a perspective view of a first conveying station of the packaging apparatus of FIGS. 1 to 3.
Figure 8:
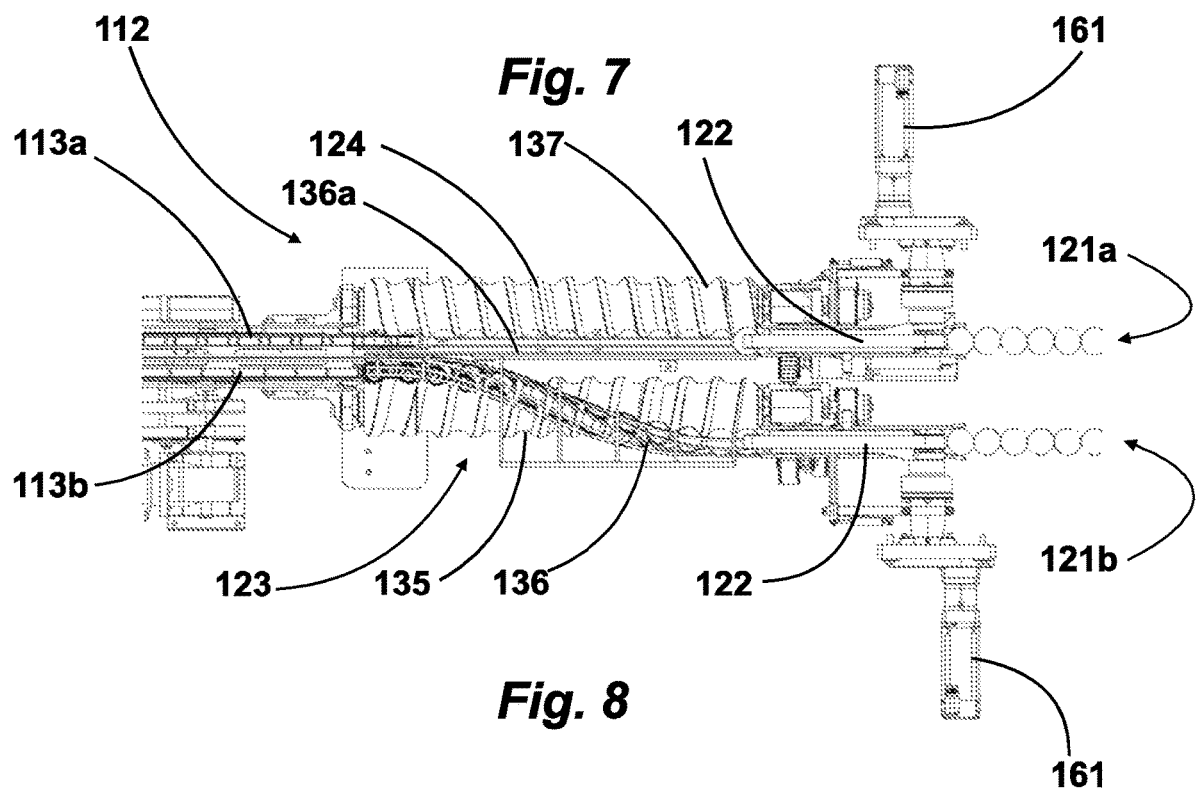
FIG. 8 shows a plan view from above of the first conveying station in FIG. 7.

In the inlet section 101, the feeder device for articles to be packaged 300 comprises an inlet line which, in this example, is formed by two inlet rows 121a and 121b (FIGS. 4 and 5).

The inlet line is connected to a first conveying station 112, which carries out said first step of conveying the articles which are intended to be packaged by means of a start equipment that regulates the passage of the capsules 1 on the basis of a feedback that takes into account the operating status of the devices of the stations that follow, and which is carried out on the basis of a first error signal in relation to the non-conformity in one or more box-shaped packagings on the respective transport line.

On the other hand, the above-described forming line, as far as an opening station 108 of the box-shaped packagings coming out of said forming line, constitutes a second conveying station of the box-shaped packagings which carries out a respective second step of conveying the box-shaped packagings in a respective continuous flow.

Any lack of conformity at the start of the box-shaped packagings in said second conveying station determines the output of a first error signal which is processed as previously described.

In other words, the parts of the forming line and the opening station are configured as a whole to generate a first error signal in the event of non-conformity of the box-shaped packagings that have been started in the respective transport line.

In more detail, the inlet line is made up of a pair of first conveyor belts on which the capsules 1 travel on a single and continuous row, in contact with each other. At the inlet section 101, each capsule 1 is collected by the first conveying station 112 which comprises a pair of accelerator belts 122, one for each conveyor belt, acting on the bottom and on the head of each capsule 1, so that they are sent to the packaging device 300 producing, downstream, a continuous advance flow.

Each accelerator belt 122 is driven by an electric motor 161 which is controlled by said control unit 500. For particular purposes, the two accelerator belts 122 can be stopped independently of each other, and if they are stopped at the same time, the start of the articles which are intended to be packaged is suspended.

Figure 9:
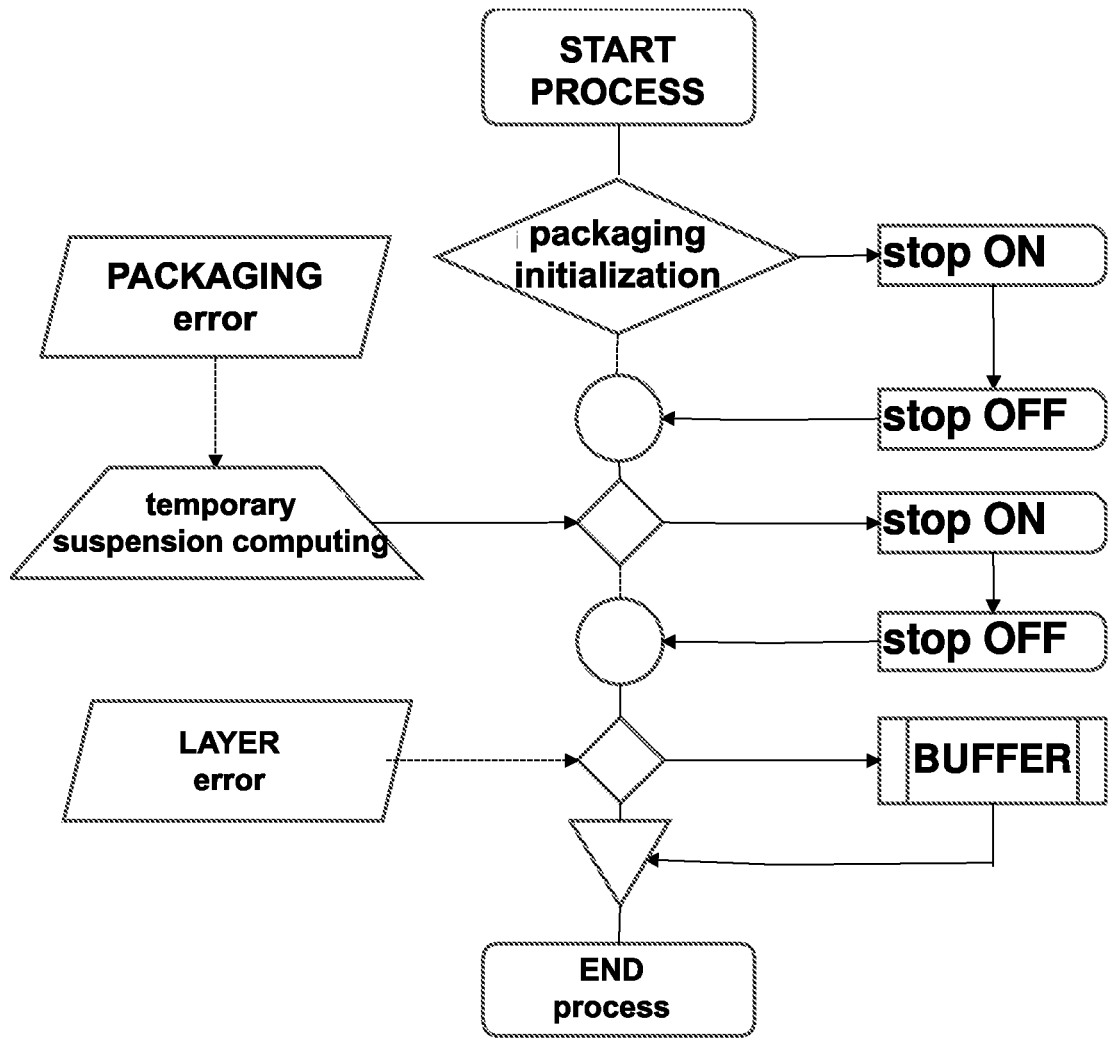
FIG. 9 shows a block diagram illustrating an example of an embodiment of the packaging process according to the present invention.

The control unit 500, as shown in FIG. 9, suspends said first conveying step when a first error signal is output in the manner described above.

When said output of the first error signal ceases, the accelerator tapes are restarted.

In particular, when said first error signal is output, there is provided, in said control unit 500, a processing of how many and which articles which are intended to be packaged will not be deposited in the box-shaped packagings that will not be available.

Thus, the accelerator belts may be stopped, in feedback to said first error signal and independently of each other, on the basis of said processing, i.e. to temporarily prevent a selected quantity of articles which are intended to be packaged from accessing said first transport line 115.

From the accelerator belts 122, the capsules 1 are captured by the upturning equipment 301 and spacer equipment 302 of the feeder device 300, which will be described below in more detail, so that, after the conveying station 112, the capsules 1 are spaced apart from each other, and the capsules of one of the rows of the inlet line are upturned, so that the capsules 1 of that row are in an upturned arrangement.

The upturning equipment 301 receives the capsules of a row 121b of the inlet line, and comprises a respective first cylindrical screw conveyor 123, rotating at a predetermined rotational speed, with a respective first groove 135 which is arranged according to a helix principle with an inlet end.

Thus, the first groove 135 receives the capsules 1 continuously. The upturning equipment 301 further comprises a fixed guide 136, which cooperates with said first screw conveyor 123 to upturn the capsules 1.

For this purpose, the first fixed guide 136 extends in a helical shape around the first screw conveyor 123 with a spacing which is substantially equal to its length and an overall rotation angle of approximately 180°. In this manner, the capsules 1 are received by the first screw conveyor 123 at the inlet end thereof in an upright arrangement, and they are conducted by the first screw conveyor 123 along the fixed guide 136 as far as an opposing outlet end thereof where the capsules 1 are released in upturned arrangement.

It will be noted that the upturning equipment 301 also acts as a spacer equipment, because the spacing between the capsules 1 exiting the first screw conveyor 123 is defined by the spacing of the first groove 135.

At the other row 121*a* of the inlet line, there is provided a spacer equipment 302 which provides for spacing the capsules 1 from each other, but without upturning them. It comprises a respective second cylindrical screw conveyor 124, rotating at a predetermined rotational speed, with a respective second groove 137 provided according to a helix principle with an inlet end, which continuously receives the capsules 1, and an outlet end at which the capsules are uniformly equidistant. A corresponding fixed guide 136*a*, extending substantially rectilinearly parallel to the axis of the second screw conveyor 124, is associated with the second screw conveyor 124.

Both the first screw conveyor 123 and the second screw conveyor 124 impart to each capsule 1 a predetermined acceleration at said inlet end, so as to space the capsules 1 from each other. This is achieved by continuously varying the helical spacing of the respective groove 135, 137.

The first screw conveyor 123 operates by continuously upturning the capsules 1 of a row 121*b* of the inlet line, that is a part thereof: it is understood that the rows of the inlet line may be more than two and that more than one row of the inlet line may be subject to the upturning of the articles to be packaged.

With this process, two corresponding rows 113*a*, 113*b* in the conveying line 113 are obtained from the two rows of the inlet line 121*a*, 121*b*, with capsules 1 in an upright arrangement and with capsules 1 in an upturned arrangement, respectively.

The rows 113*a*, 113*b* of the conveying line 113 flank a transfer station 114, wherein the capsules 1 are transferred from the conveying line 113 to respective rows 115*a*, 115*b* of a first transport line 115, wherein the arrangements of the single capsules 1 are arranged according to a predetermined pick-up pattern.

The rows 113*a*, 113*b* of the conveying line 113 flank a transfer station 114, wherein the capsules 1 are transferred from the first conveying line 113 to respective two rows 115*a*, 115*b* of the first transport line 115, wherein the arrangements of single capsules 1 are arranged according to a predetermined pick-up pattern.

Between the conveying line 113 and the first transport line 115 there are provided, in the transfer station 114 of the feeder device 300, a pair of first transfer devices 251*a*, 251*b* realized by respective Delta-type robotic systems, which are arranged in succession, and supported by the cage frame 109 above.

Each first transfer device 251*a*, 251*b* comprises a first handling member having a first assembly of three articulated support arms 126, which performs the function of a self-moving transfer arm.

They are provided to transfer a number of capsules 1 from a single row of the conveying line 113, which will then be either all in upright arrangement or all in upturned arrangement. Each transfer device has a respective gripping device 127 with a plurality of gripping elements 128 to each grip a single capsule 1 in any arrangement.

During the transfer, the gripping elements 128 move by staggering the capsules 1 that have been removed from each other, so that they can be arranged on the first transport line 115 in a position compatible with the pick-up pattern, which the first transfer devices compose during their operation.

It should be noted that, in this transfer process, the capsules 1 are transferred with a direct transfer path, in which the capsules removed from the conveying line 113 are at least partially staggered to each other during their path and, without intermediate stops, are laid on the first transport line 115 according to a predetermined pattern.

The number of rows 121*a*, 121*b* of the inlet line coincides with the number of the rows 113*a*, 113*b* of the conveying line 113 and the number of the rows 115*a*, 115*b* of the first transport line 115, i.e. two.

The transfer between the two lines 107, 115 is carried out by a succession of second transfer devices 200, realized by robotic systems, in particular of the Delta type, which comprise a handling member, in particular a second assembly of articulated arms 201, and a second gripping device 202 which is controlled by said handling member, movable along three orthogonal axes, (X, Y, Z).

The second robotic transfer devices 200 are supported by the cage frame 109 above.

Each second gripping device 200 is capable of removing, from said first transport line 115, an entire single layer 38 of predetermined dimensions of articles which are intended to be packaged by forming on it said predetermined pattern.

Since the layer 38 may have a width greater than that of the two rows 115*a*, 115*b* of the first transport line, each second gripping device 202 may make multiple removals from the first transport line 115, forming for example a layer of 3×4 format, requiring two consecutive removals, or a 4×6 layer, which also requires two removals from a longer section of the first transport line 115.

The removals therefore precede the transfer step and the insertion step in the capsules 1, so that the insertion of a single layer 38 into a box-shaped intended packaging 30 is done in a single operation.

To possibly manage a quantity of layers of different sizes, the second packaging device comprises, for each second transfer device 200, a set of interchangeable gripping devices 202, so that each gripping device in the set is provided for the entire range of layers that the second packaging device 200 can handle.

The gripping device 202 comprises a plurality of gripping elements 203, each capable of removing a single capsule 1, which are supported by a respective support 204 protruding from a body 205 of the second gripping device 202.

In this embodiment, for each second transfer device 200, the packaging device 100 comprises an image recording device 210, in particular a digital camera, connected to the control unit. However, it is understood that the packaging device 200 could have a number of cameras lower than the number of the second transfer devices 200, but a camera can be enslaved to more than a second transfer device 200.

In this example, the image recording device 210 is positioned downstream of each transfer device 200 relative to the second transport line 107, to detect, after insertion, the conformity of the layers 38 deposited in the box-shaped packagings of the flow associated with the second transport line 107.

In the present example, the camera operates with a focal spacing corresponding to the spacing between its lens and the layer 38 to be detected, so as to distinguish the presence or absence of the layer 38.

The camera is positioned by a fixed support 211 above the second transport line 107, at a predetermined spacing from the respective second transfer device 200.

Therefore, the image recording device 210 further comprises an image processing unit capable of analysing the images detected by the camera and comparing them with a control image, corresponding to a correct deposition of the layer 38, in order to detect any discrepancies. The image processing unit is thus able to output a signal of correct placing of the layer 38, or a second error signal corresponding to an incorrect placing of the layer 38, and to transmit this signal to the control unit. It should be noted that the image processing unit can be physically positioned either at the camera or at the control unit.

The packaging device 200 comprises a plurality of buffers 116, arranged in the region of said first transport line 115, capable of receiving capsules 1 therein laid by the second transfer devices 200 in case it is impossible to insert them in the intended packaging.

In particular, in combination with said image and signals recording devices 210 provided to the control unit, the second transfer devices 200 lay the capsules subsequent to a signal of incorrect formation of a previous layer 38, so that the capsules are not laid in a packaging intended to be discarded.

The buffers 116 comprise support planes which are positioned close to the second transfer devices 200, on which the capsules are positioned in a predetermined arrangement.

In this respect, the support planes have respective recesses to receive a single capsule each, thus identifying said predetermined arrangement.

The control unit, by means of the second transfer devices 200, can in due course provide for the removal of the capsules 1 from said buffers 116 for their transfer to subsequent intended packagings. On this occasion, the conveying station 112 will interrupt the flow of capsules 1 on inlet line 121.

It is understood that box-shaped packagings 30, for which a lack of conformity with the instructions in relation to the deposit of the capsules, in particular of the layers of capsules transferred by the aforesaid transfer devices 200, has been detected, whether the packaging has nevertheless completed its filling or whether the packaging is still missing layers, the capsules of which are deposited in the buffers 116, this packaging, at the end of its transport line 107, is discarded by a diverter equipment which may be of a substantially conventional type.

The discarded material will then be recovered, if possible, and reintroduced to the packaging cycle.

If, following a major malfunction, the space in said buffers 116 is exhausted, recovery tanks 117 are present alongside the buffers 116, capable of receiving excess capsules from the second transfer devices 200.

However, an error signal capable of suspending the supply of capsules at their inlet station may be output, as is the case when an error in the formation or a lack of box-shaped packagings 30 are detected.

Once the filling is complete, the filled box-shaped packagings 30 arrive at a closing station 110. Subsequently, the closed box-shaped packagings 30 reach a discharge end 111, from where they are sent to a packaging apparatus.

To the above-described packaging apparatus and device and process for supplying articles which are intended to be packaged, a person skilled in the art may, in order to meet additional and contingent requirements, make numerous further modifications and variations, all of which are, however, within the scope of protection of the present invention as defined by the appended claims.

The invention claimed is:

1. A packaging process for articles to be packaged in box-shaped packagings, the process comprising:
   a first conveying step of conveying the articles on a first transport line, defining a first continuous flow of the articles;
   a second conveying step of conveying box-shaped packagings on a second transport line, defining a second continuous flow of box-shaped packagings in an open configuration, wherein a first conformity with predetermined instructions in relation to said box-shaped packagings is verified; and
   a transfer step of transferring the articles from the first transport line to the box-shaped packagings of said second transport line, with one or more successive transfer operations, wherein a second conformity with predetermined instructions in relation to a deposit of the articles in a box-shaped intended packaging is verified,
   wherein:
   if said first conformity is not complied with for one or more box-shaped packagings, said first conveying step is suspended so as not to supply to said first transport line the articles corresponding to said one or more box-shaped packagings, and
   if said second conformity is not complied with for one or more box-shaped packagings, the articles present on said first transport line, intended to be transferred to said one or more box-shaped packagings, are moved to one or more buffers.

2. The packaging process according to claim 1, wherein the articles moved to said buffer are subsequently transferred from the one or more buffers to other box-shaped packagings.

3. The packaging process according to claim 1, wherein the first continuous flow of articles and the second continuous flow of box-shaped packagings move in counter-current with respect to each other.

4. The packaging process according to claim 1, wherein the one or more buffers are a plurality of buffers arranged in a region of said first transport line.

5. The packaging process according to claim 1, further comprising:
   a removal step of removing the articles from said first transport line, said removal step comprising formation, in a respective transfer device, before the transfer step, of a single layer of articles having predetermined dimensions.

6. The packaging process according to claim 5, wherein said removal step comprises a plurality of operations for removing the articles before transfer of an entire single layer in a box-shaped packaging.

7. An apparatus for packaging articles supplied to a first transport line in a continuous flow, the apparatus comprising:
   a first conveying station for said articles;
   a second transport line configured to transport a second continuous flow of box-shaped packagings in an open configuration, the box-shaped packagings being capable of being filled with said articles;
   a second conveying station for said box-shaped packagings, configured to generate a first error signal for each box-shaped packaging not complying with respective first predetermined instructions;
   at least one transfer device, each configured to remove at least one layer of articles and configured to deposit the at least one layer of articles in a box-shaped packaging of said second continuous flow;
   one or more image recording devices, each corresponding to, and being positioned downstream of, one or more respective transfer devices with respect to the second continuous flow, said one or more image recording devices being configured to record conformity of layers of articles deposited by said one or more respective transfer devices and to output a second error signal in case of lack of conformity; and a control unit configured to
(i) receive said first and second error signals,
(ii) suspend said first continuous flow in said first conveying station upon receipt of said first error signal so as not to supply in said first transport line articles corresponding to a box-shaped packaging related to said first error signal, and
(iii) control transfer devices downstream of an image recording device that generate said second error signal so that said transfer devices transfer, to one more buffers, articles present on said first transport line that are intended to be deposited in a box-shaped packaging related to said second error signal.

8. The apparatus according to claim 7, wherein said first transport line and said second transport line are arranged parallel with each other.

9. The apparatus according to claim 7, wherein the at least one transfer device comprise a succession of transfer devices performing the transfer of the articles from the first transport line to the box-shaped packagings on the second transport line.

10. The apparatus according to claim 7, wherein the first continuous flow and the second continuous flow move in counter-current with respect to each other.

11. The apparatus according to claim 7, wherein said first conveying station comprises an inlet conveying line configured to supply said first transport line on a plurality of rows to continuously transport the articles.

12. The apparatus according to claim 11, wherein said first conveying station comprises a spacer mechanism configured to space the articles in each row.

13. The apparatus according to claim 7, wherein the at least one transfer device and the one more image recording devices are in a one-to-one correspondence with each other.

14. The apparatus according to claim 7, wherein the one or more buffers are a plurality of buffers arranged in a region of said first transport line.

15. A packaging control process comprising:
conveying on a first transport line articles to be packaged on a first transport line, defining a first continuous flow of the articles;
conveying box-shaped packagings on a second transport line, defining a second continuous flow of box-shaped packagings in an open configuration;
transferring the articles from the first transport line and deposit the articles to the box-shaped packagings of said second transport line with one or more successive transfer operations;
outputting a first error signal for each box-shaped packaging not complying with respective first predetermined instructions; and
outputting a second error signal in case of a deposit not complying with respective second predetermined instructions,
wherein:
said first error signal determines a suspension of said conveying of the articles, and
said second error signal determines a redirection of the articles, intended to be transferred, to at least one buffer for a subsequent transfer from the at least one buffer to other box-shaped packagings.

16. The packaging control process according to claim 15, wherein outputting said first error signal occurs when a box-shaped packaging is not suitable for being filled.

17. The packaging control process according to claim 15, wherein outputting said first error signal occurs when a box-shaped packaging is not present in a respective continuous flow.

18. The packaging control process according to claim 15, wherein outputting said first error signal occurs when one or more box-shaped packagings are filled with articles removed from the at least one buffer.

* * * * *